United States Patent
Yang et al.

(10) Patent No.: US 8,650,701 B2
(45) Date of Patent: Feb. 18, 2014

(54) CONNECTING ASSEMBLY FOR WINDSHIELD WIPER

(75) Inventors: Chih-Ming Yang, Taipei (TW); Chuan-Chih Chang, Taipei (TW)

(73) Assignee: Danyang UPC Auto Parts Co., Ltd., Danyang (CN)

( * ) Notice: Subject to any disclaimer, the term of this patent is extended or adjusted under 35 U.S.C. 154(b) by 406 days.

(21) Appl. No.: 13/025,208

(22) Filed: Feb. 11, 2011

(65) Prior Publication Data

US 2012/0054976 A1    Mar. 8, 2012

(30) Foreign Application Priority Data

Sep. 7, 2010   (TW) ............................... 99217296 U
Dec. 13, 2010  (TW) ............................... 99224092 U

(51) Int. Cl.
    *B60S 1/40*    (2006.01)
(52) U.S. Cl.
    USPC .................................. 15/250.32; 15/250.351
(58) Field of Classification Search
    USPC ............ 15/250.32, 250.43, 250.44, 250.201, 15/250.361, 250.351, 250.31, 250.33
    See application file for complete search history.

(56) References Cited

U.S. PATENT DOCUMENTS

| 6,530,111 | B1 | 3/2003 | Kotlarski |
| 7,891,044 | B2 | 2/2011 | Fink et al. |
| 8,381,348 | B2* | 2/2013 | Egner-Walter et al. .... 15/250.04 |
| 2008/0134455 | A1* | 6/2008 | Kinnaert et al. ........... 15/250.32 |
| 2011/0047742 | A1* | 3/2011 | Kim et al. .................. 15/250.32 |

FOREIGN PATENT DOCUMENTS

| DE | 102005016486 A1 | 10/2006 |
| DE | 102008049269 A1 | 4/2010 |
| EP | 2113432 A1 | 2/2008 |
| TW | M315183 U | 7/2007 |
| WO | WO2005039944 A1 | 5/2005 |

* cited by examiner

*Primary Examiner* — Gary Graham
(74) *Attorney, Agent, or Firm* — Chun-Ming Shih; HDLS IPR Services

(57) ABSTRACT

A connecting assembly (10) for a windshield wiper (10) includes a fixing member (11) and a supporting arm (12). The connecting assembly (20) includes a pivoting base (21) and a cover cap (22). The pivoting base (21) comprises an engaging portion (211), a first insertion portion (212) and a second insertion portion (213) extending from the engaging portion (211) in opposite directions. The engaging portion (211) is engaged with the fixing member (11). The first insertion portion (212) and the second insertion portion (213) are symmetrical to each other with respect to the engaging portion (211). The cover cap (22) is assembled with the supporting arm (12) and put outside the first insertion portion (212) and the second insertion portion (213) in dual directions. Since the first insertion portion (212) and the second insertion portion (213) are configured to be symmetrical to each other, the supporting arm (12) can be firmly connected to the windshield wiper (10) with a changeable connecting direction.

6 Claims, 9 Drawing Sheets

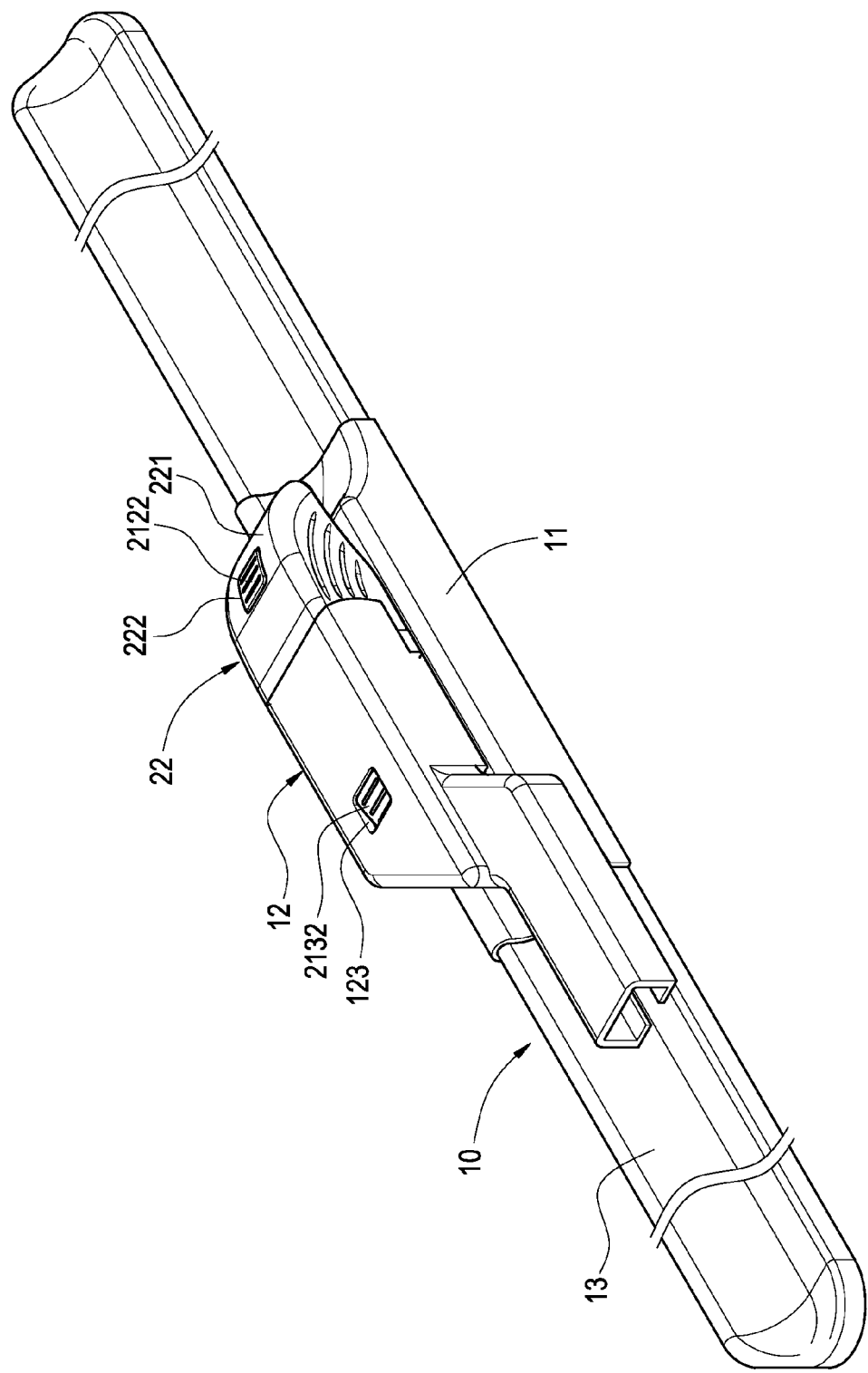

CONNECTING ASSEMBLY FOR WINDSHIELD WIPER

BACKGROUND OF THE INVENTION

1. Field of the Invention

The present invention relates to a windshield wiper, and in particular to a connecting assembly for a windshield wiper.

2. Description of Prior Art

A windshield wiper includes a supporting piece, a connector and a wiper blade. The connector is fixed to the middle portion of the top surface of the supporting piece. The wiper blade is fixed to the bottom surface of the supporting piece. The connector is connected to a wiper arm, so that the wiper arm can drive the windshield wiper for operation. By this structure, the wiper blade can wipe off rain or dirt attached onto the windshield.

When the above-mentioned windshield wiper suffers damage, the supporting piece and the wiper blade can be replaced by a new one. Thus, it is advantageous to design the connector as an interchangeable component suitable for various kinds of automobiles. For example, Taiwan Patent No. M315183 discloses a windshield wiper, in which a connecting assembly having two locking arms engaged with the supporting piece is provided.

However, the locking arms of the connecting assembly are formed by extending from a base, so that the locking arms are not solid and may get broken easily. Further, not all supporting pieces are provided with a locking trough for allowing the locking arm to be engaged therewith. On the other hand, unlike the conventional windshield wiper, the current windshield wiper is required to swing in multiple directions in order to increase its function. As a result, the connecting assembly for the current windshield wiper has to be configured to meet the above demands.

Therefore, it is an important issue for the present Inventor to solve the above-mentioned problems.

SUMMARY OF THE INVENTION

The present invention is to provide a connecting assembly for a windshield wiper, in which a first insertion portion and a second insertion portion are configured to be symmetrical to each other. By this structure, the supporting arm and the windshield wiper can be connected easily with a changeable connecting direction.

The present invention provides a connecting assembly for a windshield wiper. The windshield wiper includes a fixing member and a supporting arm. The connecting assembly includes a pivoting base and a cover cap. The pivoting base comprises an engaging portion, a first insertion portion and a second insertion portion extending from the engaging portion in opposite directions. The engaging portion is engaged with the fixing member. The first insertion portion and the second insertion portion are symmetrical to each other with respect to the engaging portion. The cover cap is assembled with the supporting arm and put outside the first insertion portion and the second insertion portion in dual directions.

The present invention has the following advantageous features. Two side plates on both sides of the pivoting base are configured to have different thicknesses, which is a fool-proof design to facilitate the correct engagement of the pivoting base and the fixing member. Further, the supporting arm can be designed to match the two side plates of different thickness, so that the windshield wiper can be assembled more correctly.

BRIEF DESCRIPTION OF DRAWING

FIG. 9 is an assembled perspective view showing the windshield wiper according to another embodiment of the present invention.

DETAILED DESCRIPTION OF THE INVENTION

Figure 1:
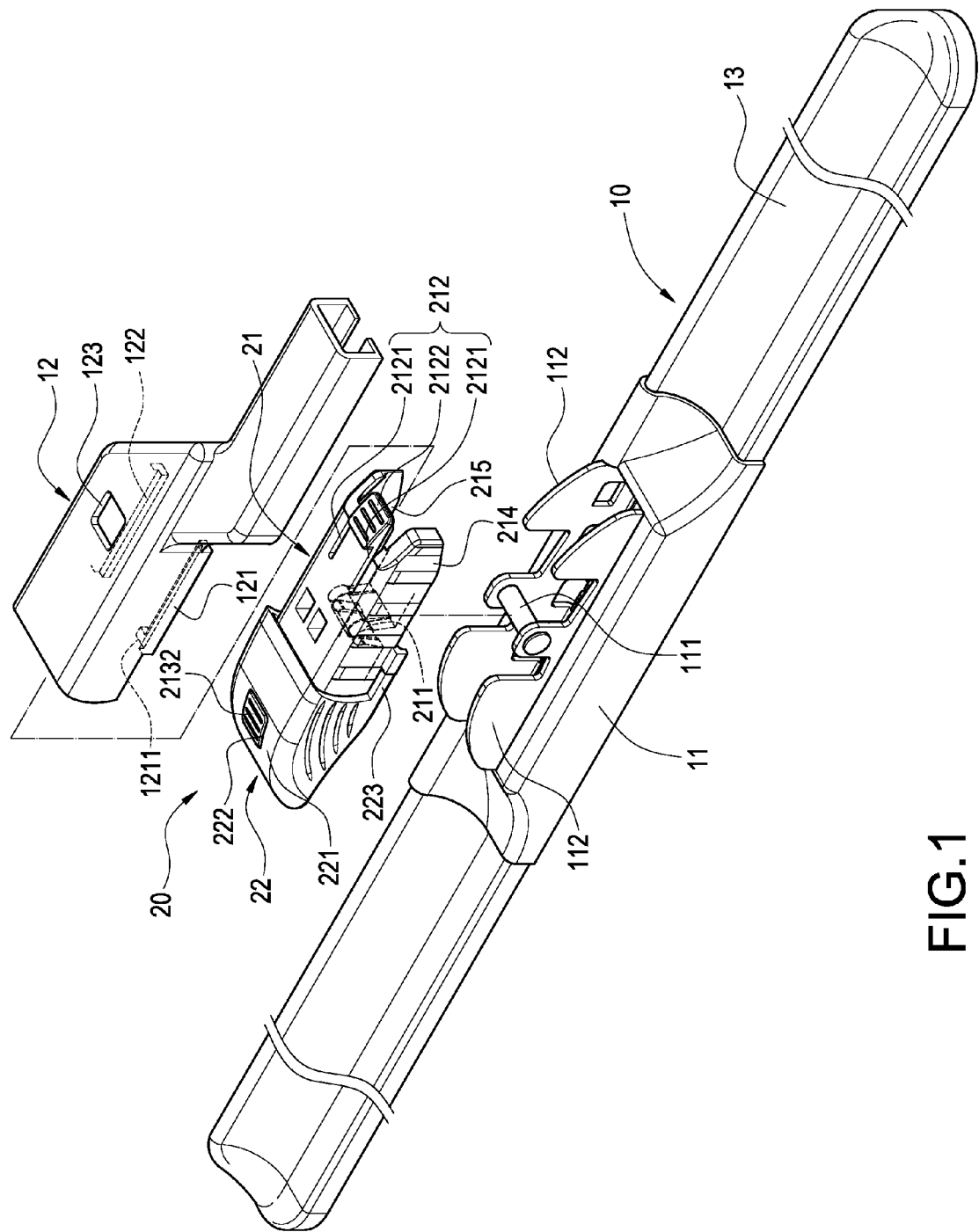
FIG. 1 is an exploded perspective view showing a windshield wiper of the present invention.
Figure 2:
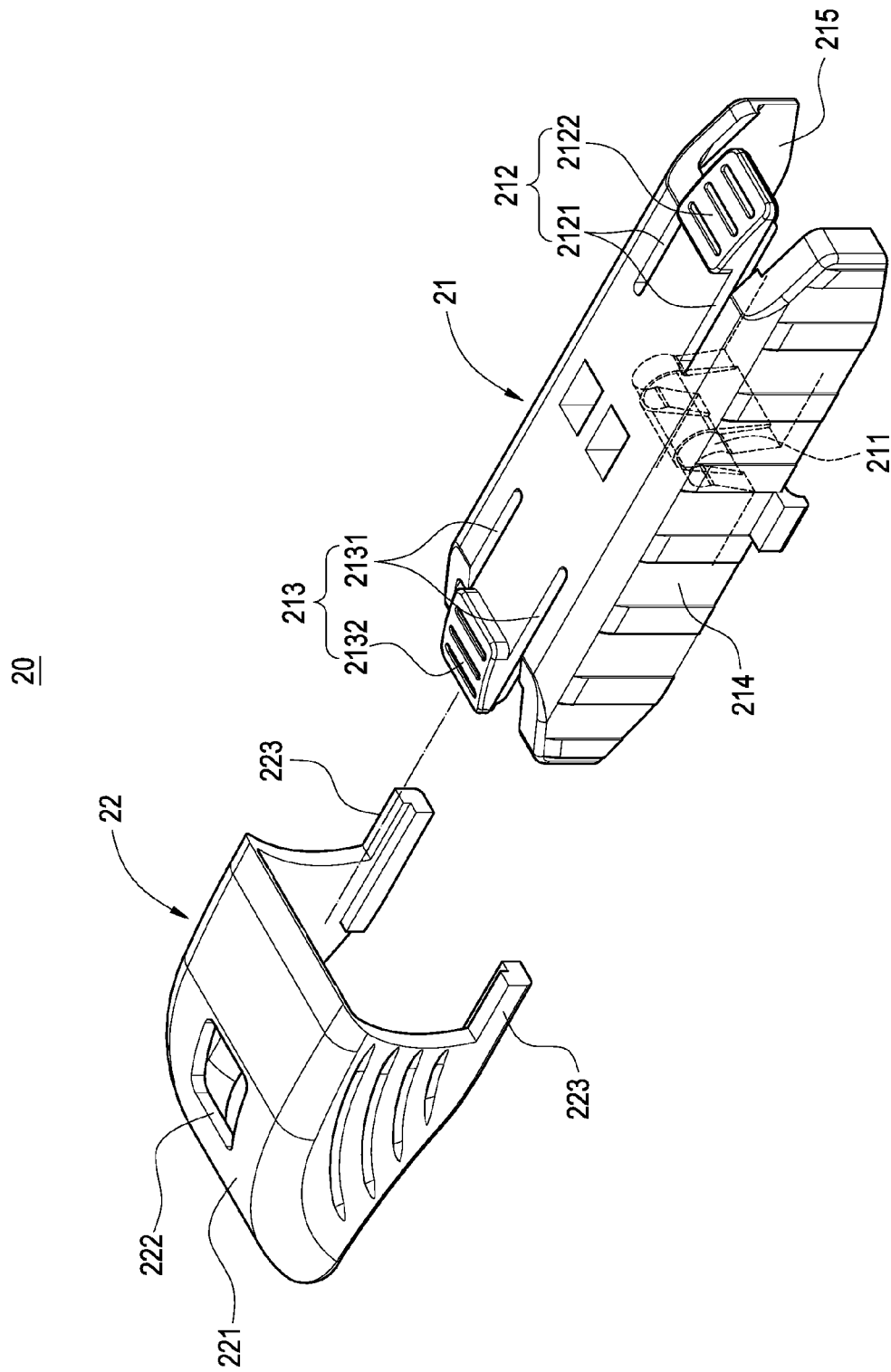
FIG. 2 is an exploded perspective view showing a connecting assembly of the present invention.
Figure 3:
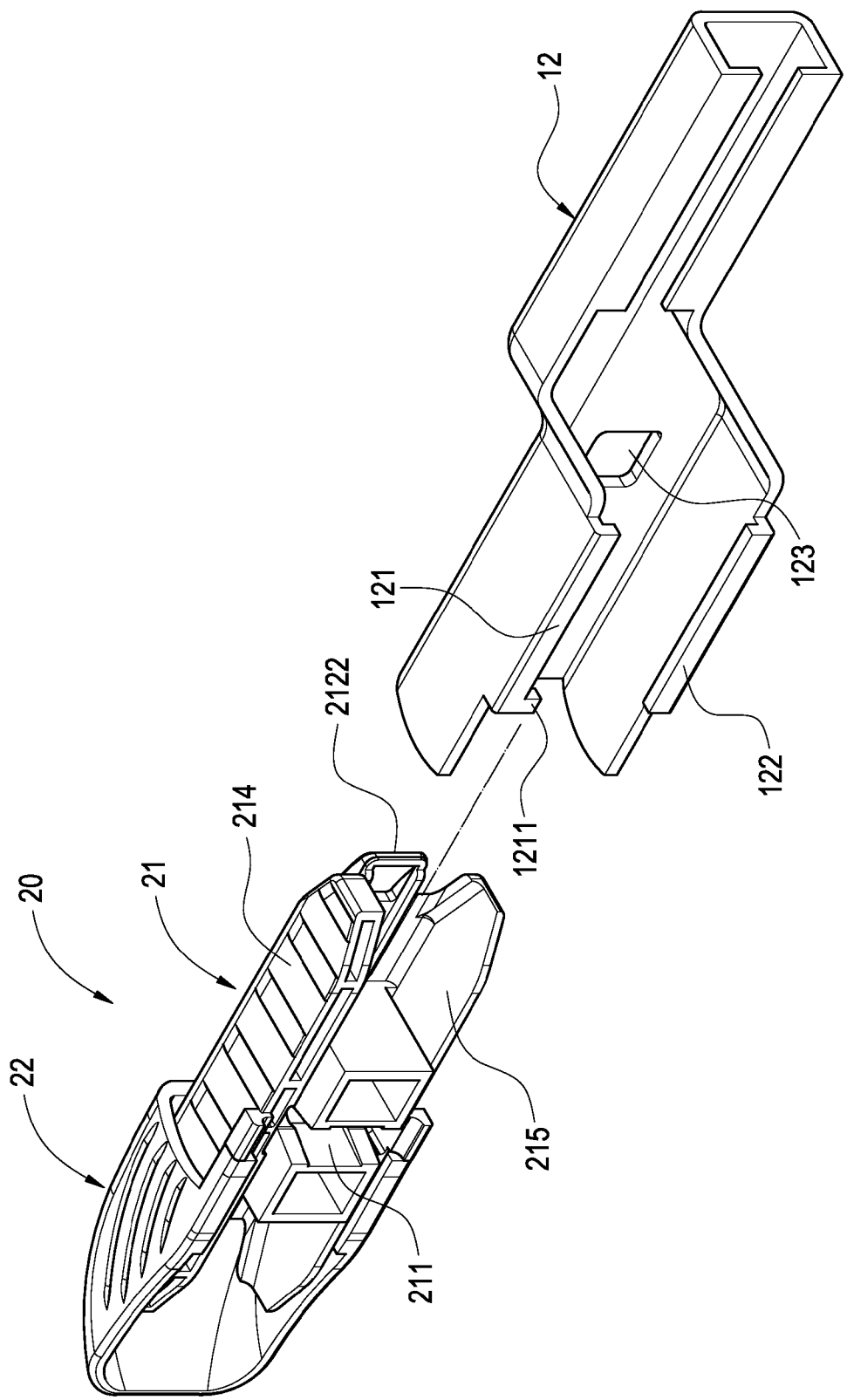
FIG. 3 is a bottom perspective view showing the connecting assembly of the present invention.
Figure 4:
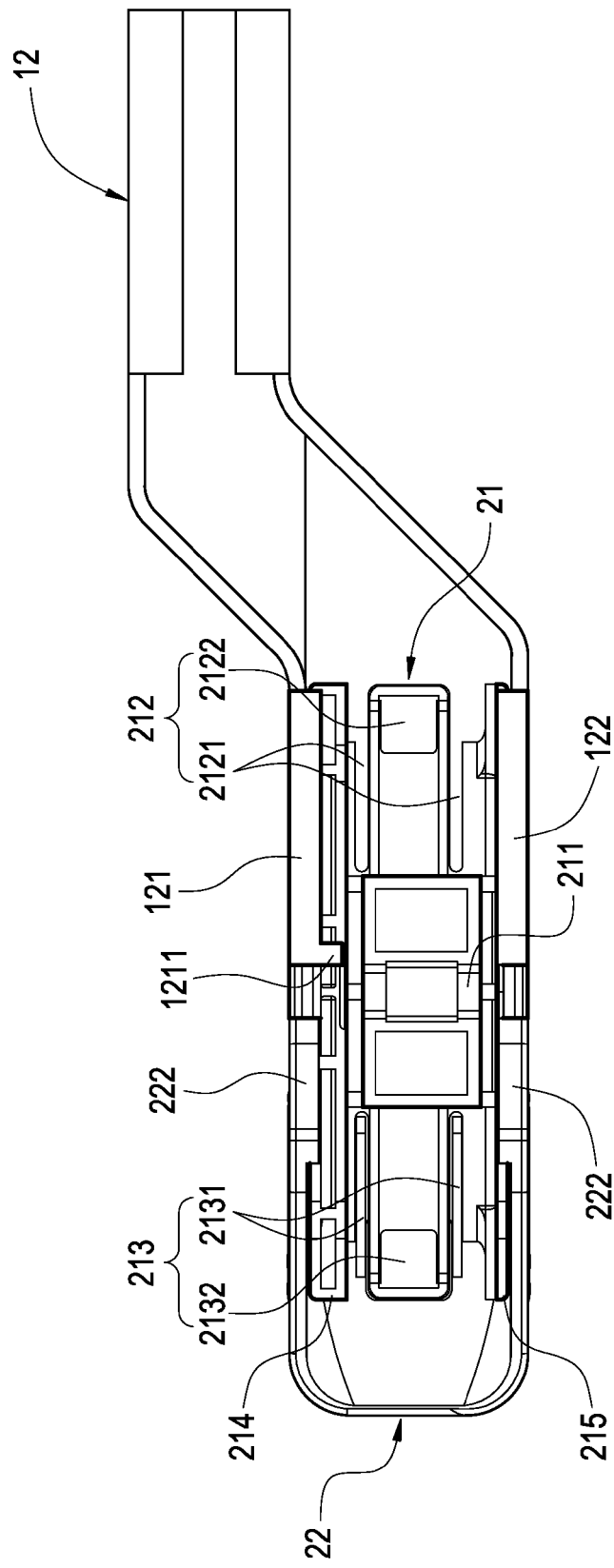
FIG. 4 is an assembled bottom view showing the connecting assembly of the present invention.

The detailed description and technical contents of the present invention will become apparent with the following detailed description accompanied with related drawings. It is noteworthy to point out that the drawings is provided for the illustration purpose only, but not intended for limiting the scope of the present invention.

Please refer to FIGS. 1 to 4. The present invention relates to a connecting assembly for a windshield wiper. The windshield wiper 10 has a fixing member 11 and a supporting arm 12. The connecting assembly 20 includes a pivoting base 21 and a cover cap 22.

The windshield wiper 20 further comprises a pressurizing piece 13 having a concave surface and an asymmetrical profile. The fixing member 11 is provided on the windshield wiper 10 and configured to have an asymmetrical profile corresponding to that of the pressurizing piece 13. The fixing member 11 comprises a shaft rod 111 and an insertion piece 112. The supporting arm 12 comprises a first locking block 121, a second locking block 122 and a trough 123. The first locking block 121 is formed with a protrusion 1211.

The pivoting base 21 comprises an engaging portion 211, a first insertion portion 212, a second insertion portion 213, a first side plate 214 and a second side plate 215. The engaging portion 211 is provided within the pivoting base 21 and engaged with the shaft rod 111 and the insertion piece 112 of the fixing member 11. The first insertion portion 212 and the second insertion portion 213 extend from the engaging portion 211 in opposite directions and are integrally formed with the pivoting base 21. The first insertion portion 212 and the second insertion portion 213 are symmetrical to each other with respect to the engaging portion 211. The first insertion portion 212 is provided with two first slots 2121 and a first end locking piece 2122 between the two first slots 2121. The second insertion portion 213 is provided with two second slots 2131 and a second end locking piece 2132 between the two second slots 2131. The first insertion portion 212 and the second insertion portion 213 are symmetrical to each other, so that the supporting arm 12 can be selectively connected to one of the first insertion portion 212 and the second insertion portion 213. Each of the first slot 2121 and the slot groove 2131 is an elongate slot. When the supporting arm 12 is connected to the first insertion portion 212 or the second insertion portion 213, the first slots 2121 or the second slots 2131 are subjected to an inward elastic deformation, so that the trough 123 can be engaged with the first end locking piece 2122 or the second end locking piece 2132. In this way, the pivoting base 21 can be fixed to the supporting arm 12. Further, in order to fix the pivoting base 21 to the pressurizing piece 13, the thickness of the first side plate 214 is larger than that of the second side plate 215. The first side plate 214 and the second side plate 215 are engaged with the first locking block 121 and the second locking block 122 respectively. The first locking block 121 is formed with a protrusion 1211 serving as a fool-proof mechanism. When the first locking block 121 is connected to the second side plate 215, the protrusion 1211 abuts against the engaging portion 211, thereby restricting the connection of the pivoting base 21 to the supporting arm 12.

The cover cap 22 has a curved plate 221. The curved plate 221 is provided with a locking hole 222. One side of the cover cap 22 is formed with two engaging blocks 223. The cover cap 22 and the supporting arm 12 can be assembled with the first insertion portion 212 and the second insertion portion 213 in dual directions. Also, the cover cap 22 and the supporting arm 12 are assembled with the pivoting base 21. Thus, when the cover cap 22 and the supporting arm 12 are connected with the first insertion portion 212 or the second insertion portion 213, the first slots 2121 or the second slots 2131 are subjected to an inward elastic deformation, so that the first end locking piece 2122 or the second end locking piece 2132 can be fixed to the cover cap 22. The curved plate 221 downwardly presses the first end locking piece 2122 or the second end locking piece 2132, so that the locking hole 222 can be engaged with the first end locking piece 2122 or the second locking piece 2132. The engaging blocks 223 are fixed to the first side plate 214 and the second side plate 215, so that the cover cap 22 and the supporting arm 12 can be connected to the pivoting base 21.

Figure 5:
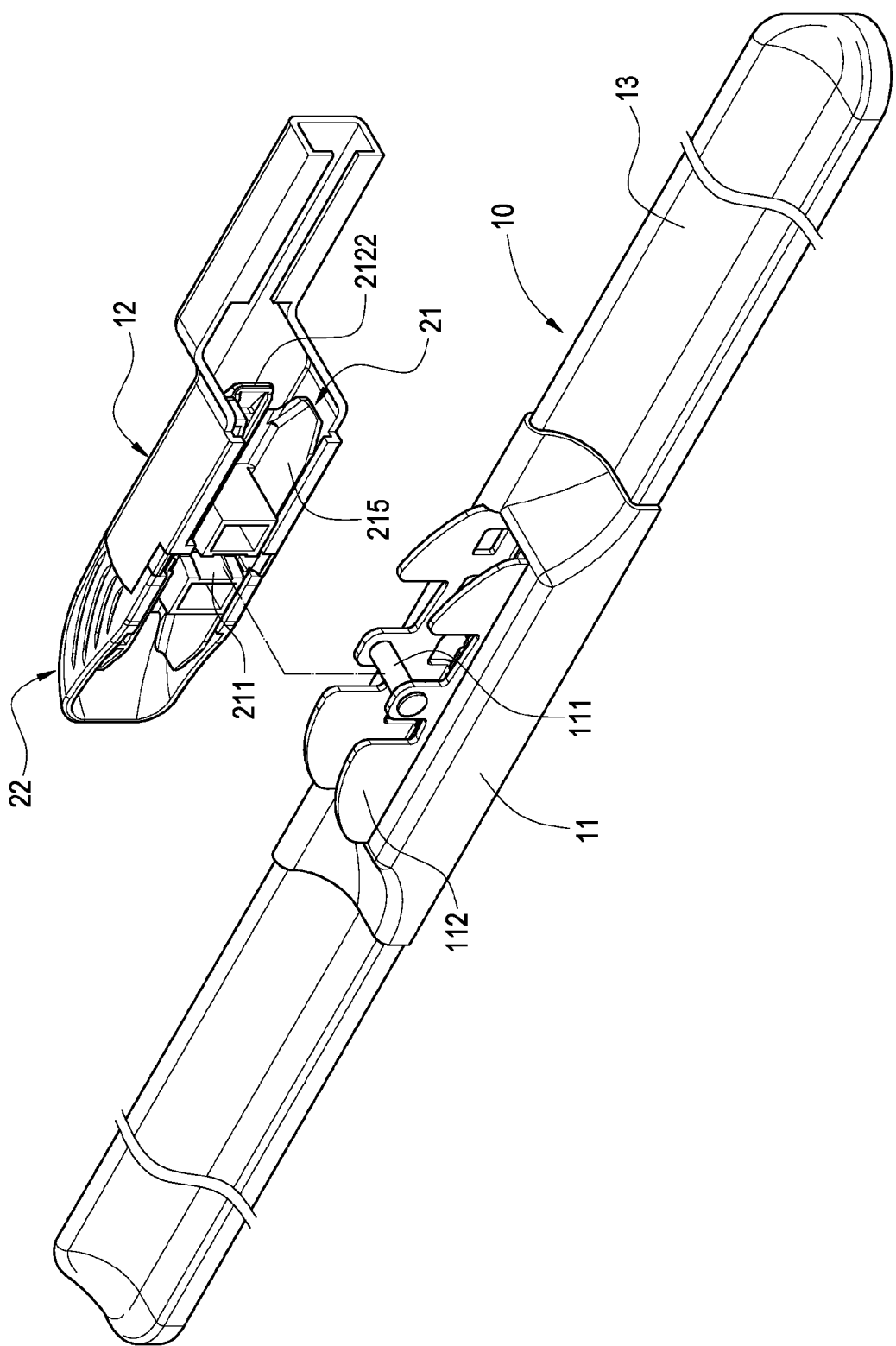
FIG. 5 is a schematic view showing the structure of the windshield wiper of the present invention.
Figure 6:
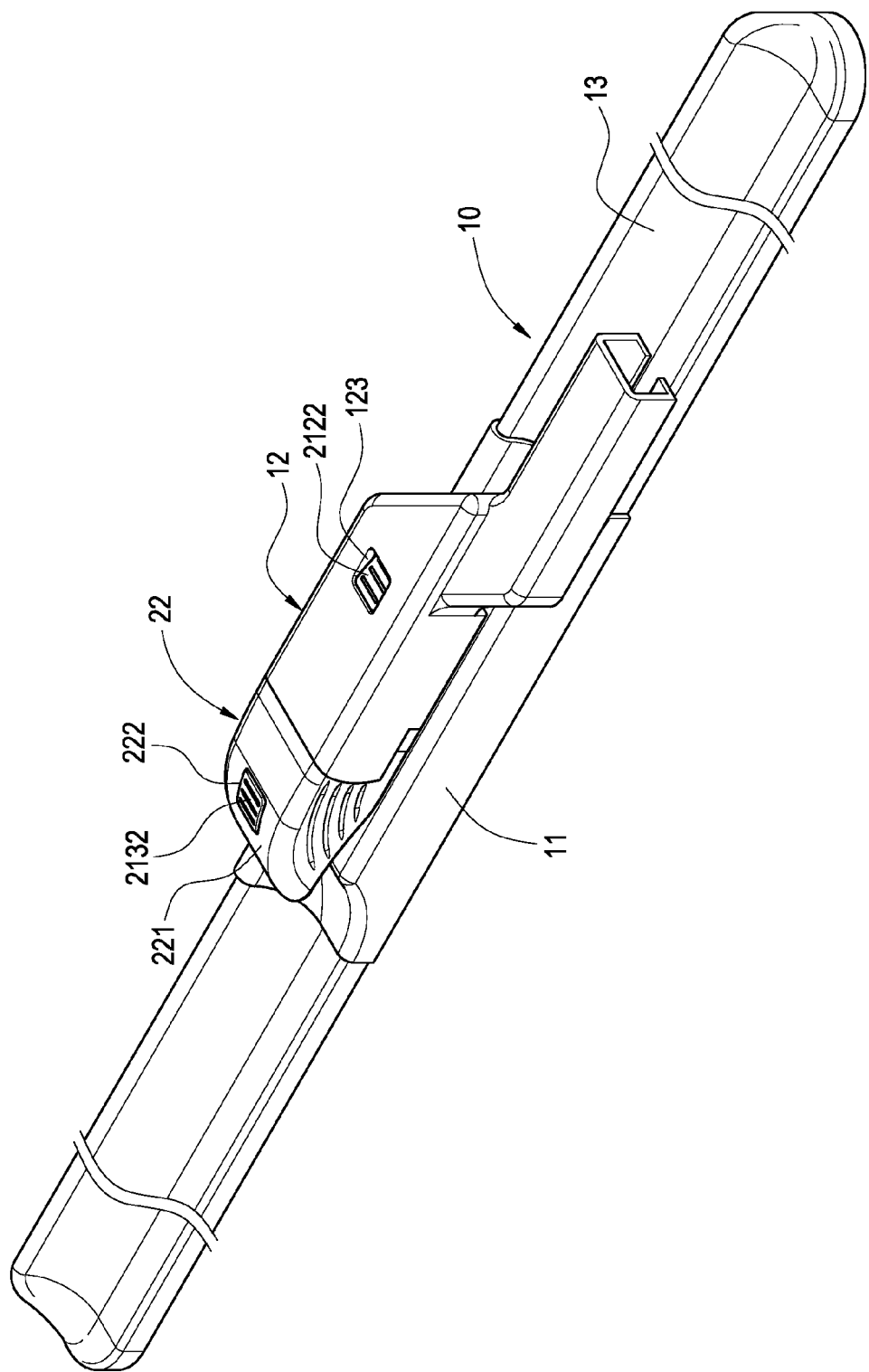
FIG. 6 is an assembled view showing the windshield wiper of the present invention.
Figure 7:
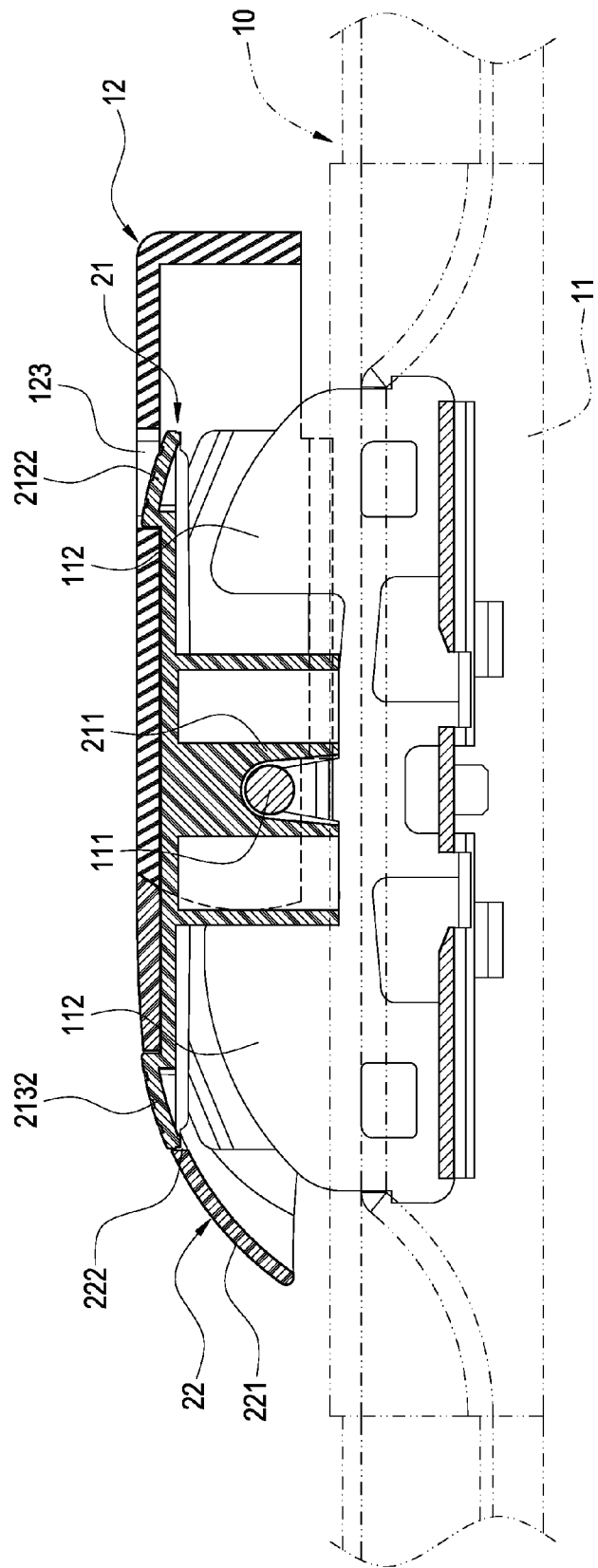
FIG. 7 is an assembled cross-sectional view showing the windshield wiper of the present invention.

Please refer to FIGS. 5 to 7, which are schematic views showing the structure of the present invention. The pivoting base 21 and the fixing member 11 are connected to the windshield wiper 10 and the supporting arm 12. The fixing member 11 is provided on the windshield wiper 10. The pivoting base 21 comprises an engaging portion 211 fixedly provided on the fixing member 11. The pivoting base 21 is further provided with a first insertion portion 212 and a second insertion portion 213 that are configured to be symmetrical to each other. The supporting arm 12 can be selectively connected to one of the first insertion portion 212 and the second insertion portion 213. As shown in these figures, when the supporting arm 12 is connected to the first insertion portion 212, the first slots 2121 are subjected to an inward elastic deformation, so that the trough 123 is engaged with the first end locking piece 2122, thereby fixing the pivoting base 21 to the supporting arm 12. At this time, the cover cap 22 is connected to the second insertion portion 213 to face the supporting arm 12. The second slots 2131 are subjected to an elastic deformation, so that the locking hole 222 can be engaged with the second end locking piece 2132. In this way, the cover cap 22 and the supporting arm 12 are connected with the pivoting base 21, thereby allowing the supporting arm 12 to be connected to the windshield wiper 10 in one direction. Therefore, the windshield wiper 10 can swing in one direction.

Figure 8:
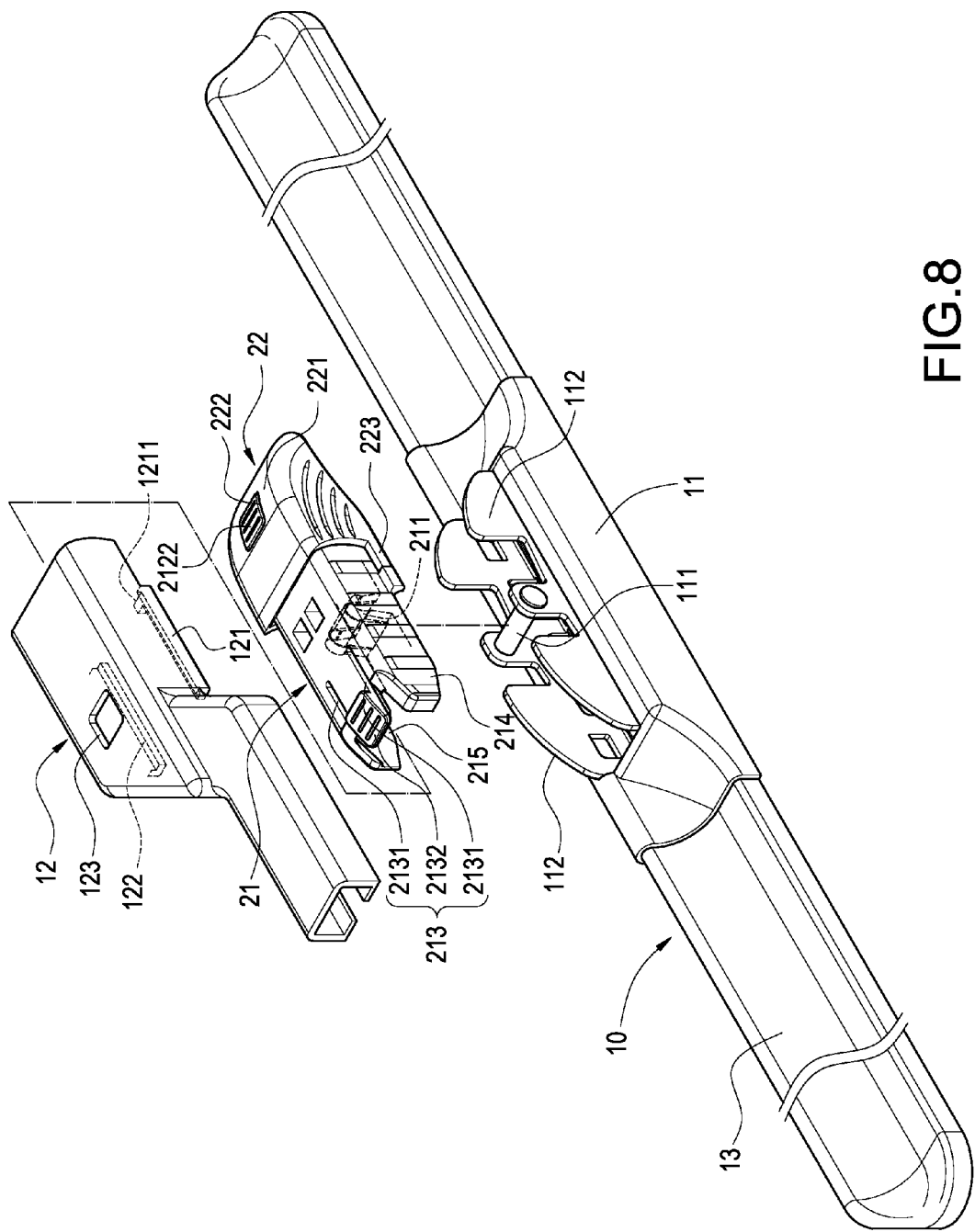
FIG. 8 is an exploded perspective view showing the windshield wiper according to another embodiment of the present invention.

Please refer to FIGS. 8 and 9, which show another embodiment of the present invention. The supporting arm 12 is connected to the second insertion portion 213. The second slots 2131 are subjected to an elastic deformation, so that the second end locking piece 2132 can be engaged with the trough 123, thereby fixing the pivoting base 21 to the supporting arm 12. In this way, the cover cap 22 is connected to the first insertion portion 212 to face the supporting arm 12. The first slots 222 are subjected to an elastic deformation, so that the locking hole 222 is engaged with the first end locking piece 2122. As a result, the cover cap 22 and the supporting arm 12 are connected to the pivoting base 21, thereby allowing the supporting arm 12 to be connected to the windshield wiper 10 in another direction. Thus, the windshield wiper 10 can swing in another direction.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A connecting assembly (20) for a windshield wiper (10), the windshield wiper (10) including a fixing member (11) and a supporting arm (12), the connecting assembly (20) including:
   a pivoting base (21) comprising an engaging portion (211), and a first insertion portion (212) and a second insertion portion (213) extending from the engaging portion (211) in opposite directions, the engaging portion (211) being engaged with the fixing member (11), the first insertion portion (212) and the second insertion portion (213) being symmetrical to each other with respect to the engaging portion (211); and
   a cover cap (22) assembled with the supporting arm (12), the supporting arm (12) and the cover cap (22) being put outside the first insertion portion (212) and the second insertion portion (213) respectively,
   wherein a trough (123) of the supporting arm (12) is engaged with a first end locking piece (2122) of the first insertion portion (212), and a locking hole (222) of the cover cap (22) is engaged with a second end locking piece (2132) of the second insertion portion (213).

2. The connecting assembly (20) for a windshield wiper (10) according to claim 1, wherein the first insertion portion (212) is provided with first slots (2121) to form the first end locking piece (2122), and the first slots (2121) are subjected to an inward elastic deformation of the first insertion portion (212) when the supporting arm (12) is connected to the first insertion portion (212), thereby fixing to the supporting arm (12).

3. The connecting assembly (20) for a windshield wiper (10) according to claim 1, wherein the second insertion portion (213) is provided with second slots (2131) to form the second end locking piece (2132), and the second slots (2131) are subjected to an inward elastic deformation of the second insertion portion (213) when the cover cap (22) is connected to the second insertion portion (213), thereby fixing to the cover cap (22).

4. The connecting assembly (20) for a windshield wiper (10) according to claim 1, wherein the cover cap (22) has a curved plate (221), and the curved plate (221) is provided with the locking hole (222).

5. The connecting assembly (20) for a windshield wiper (10) according to claim 4, wherein the curved plate (221) downwardly presses the second end locking piece (2132), so that the second end locking piece (2132) can be engaged in the locking hole (222).

6. The connecting assembly (20) for a windshield wiper (10) according to claim 1, wherein the pivoting base (21) has a first side plate (214) and a second side plate (215), the thickness of the first side plate (214) is larger than that of the second side plate (215).

\* \* \* \* \*